UNITED STATES PATENT OFFICE.

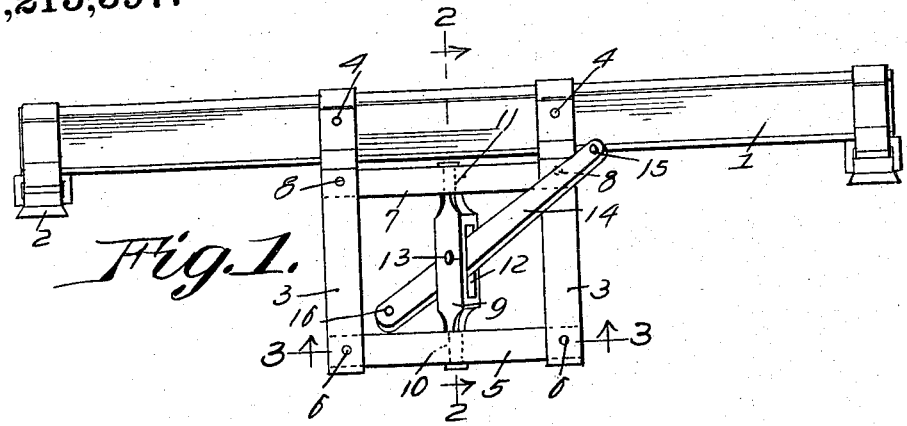

CHARLES D. MORRIS, OF NORFOLK, VIRGINIA.

BRAKE-BEAM.

1,215,397. Specification of Letters Patent. Patented Feb. 13, 1917.

Application filed June 7, 1916. Serial No. 102,222.

*To all whom it may concern:*

Be it known that I, CHARLES D. MORRIS, a citizen of the United States, residing at Norfolk, in the county of Norfolk and State of Virginia, have invented certain new and useful Improvements in Brake-Beams, of which the following is a specification.

This invention relates to certain new and useful improvements in brake beams and it has for an object among others to provide a brake beam with a fulcrum of novel construction adjustable to any position which can be readily attached to most any brake beam, the I-iron beam or Pennsylvania standard, and it has for another object to do away with right and left brake beams, the fulcrum being so arranged as to answer the purpose of right and left brake beams.

It has for a further object to strengthen the brake beam by reason of the pull not being in the center of the beam.

The invention has for a further object to provide an improved brake beam fulcrum which shall be cheap, easy to make, easily applied and removed, requiring but little time and not requiring skilled labor as there are no threaded bolts or nuts to be removed.

In prior forms of fulcrums, to make a right and left brake beam, they have to be attached to specially designed beams, that is, with a strut rod, in order to apply the fulcrum, which cannot be used on any other style of beam. It also requires tools to change such a fulcrum, it being put together with nuts and bolts. The fulcrum has to be taken apart and changed end for end, in order to change from right to left, or reverse. Such fulcrum cannot be attached to an I-iron beam or Pennsylvania standard, or any other style of beam that is not provided with a strut rod. Such style of fulcrum also throws all of the strain into the middle of the beam which weakens the beam.

My improved fulcrum is perfectly free to move in any position desired, requiring no tools except the operator's hands to adjust it to the right position and the construction is such that the pull or strain on the beam is not in the center of the beam but away from the center on each side thereof, the strain being in two places instead of one, thus making the beam much stronger and less liable to injure it.

Other objects and advantages of the invention will hereinafter appear and the novel features thereof will be particularly pointed out in the appended claims.

My improvement is capable of embodiment in a variety of forms, the most preferable of which only are herein illustrated. The invention, in such preferred forms, is clearly illustrated in the accompanying drawings, which, with the numerals of reference marked thereon, form a part of this specification, and in which—

Figure 1 is a top plan view of a brake beam, showing my improvement applied thereto.

Fig. 2 is a section on the line 2—2 of Fig. 1, looking in the direction of the arrows.

Fig. 3 is a section on the line 3—3 of Fig. 1, looking in the direction of the arrows.

Fig. 4 is a plan, with portions of the brake beam broken away, showing another form of the invention.

Like numerals of reference indicate like parts throughout the different views.

Referring to the drawings, 1 designates the brake beam or compression member which may be of any desired cross sectional contour, in the present instance being shown as of the well-known or standard I-iron form carrying the shoes 2, 2 which also may be of any well-known or approved form, my invention not residing either in the form of the beam or of the shoes carried thereby, being applicable to various forms of beams and shoes.

3, 3 are fulcrum pull braces which embrace the beam 1, being bolted or otherwise secured thereto, as seen at 4, and their other ends connected by the fulcrum equalizing brace 5, the ends of which are secured to the ends of the members 3, as shown at 6, 6, in Fig. 1. 7 is another brace member secured at 8, 8, at its ends to the fulcrum pull braces 3 adjacent their connection with the beam 1. 9 is a fulcrum member, the ends of which are swiveled at 10, 11 in the cross braces 5 and 7 respectively, as seen clearly in Fig. 1, see also Fig. 3.

The member 9 is provided with a longitudinal slot 12, see Figs. 1 and 2, in which is pivoted, as at 13, the fulcrum operating lever 14 having the openings 15, 16 at its ends for the attachment of the usual operative brake-rods.

In Fig. 4 I have shown the invention in a somewhat modified form, in which the members 3, 5, 9 and 14 are the same, but the fulcrum member 9 at one end instead of being swiveled in a transverse brace such as the member 7 shown in Fig. 1, is swiveled, as shown at 17, in a fulcrum rest 18 which is secured to the brake beam, as shown at 19. The operation is substantially the same in both forms. It is to be noted that in both of the forms shown the pull or strain is not directly in the center of the beam but away from the center on each side thereof, the strain being divided, that is taking place at two points instead of one, whereby material strength is added.

Modifications in details may be resorted to without departing from the spirit of the invention or sacrificing any of its advantages.

What is claimed as new is:—

1. The combination with a brake beam, of fulcrum pull braces secured thereto and a swiveled fulcrum mounted to take the strain away from the center of the beam.

2. A brake beam attachment comprising fulcrum pull braces attachable to the beam and a fulcrum swiveled between said braces entirely to one side of the beam.

3. An attachment for a brake beam comprising fulcrum pull braces attachable to the beam, a fulcrum equalizing brace connecting the ends of said pull braces and a fulcrum swiveled at one end in said fulcrum equalizing brace.

4. An attachment to a brake beam comprising fulcrum pull braces attachable to the beam, a fulcrum equalizing brace connecting the ends of the pull braces at a distance from the beam and a fulcrum swiveled at one end in said fulcrum equalizing brace and at the other end fulcrumed adjacent the beam.

5. An attachment to a brake beam comprising fulcrum pull braces attachable to the beam, a fulcrum equalizing brace connecting the ends of the pull braces at a distance from the beam and a fulcrum swiveled at one end in said fulcrum equalizing brace and at the other end fulcrumed adjacent the beam, and a lever pivotally mounted in said fulcrum.

6. The combination with a brake beam, of fulcrum pull braces secured thereto at one end, transverse braces connecting said pull braces at one end and adjacent the beam, and a fulcrum swiveled in said transverse braces.

In testimony whereof I affix my signature in the presence of two witnesses.

CHARLES D. MORRIS.

Witnesses:
R. L. HARTMAN,
W. L. WUETZ.

Copies of this patent may be obtained for five cents each, by addressing the "Commissioner of Patents, Washington, D. C."